(12) United States Patent
Kim et al.

(10) Patent No.: US 10,738,855 B2
(45) Date of Patent: Aug. 11, 2020

(54) DUST COVER ASSEMBLED BUMPER STOPPER

(71) Applicant: KUNHWA ENG CO., LTD., Gyeongsan-si (KR)

(72) Inventors: Young Chun Kim, Daegu (KR); Jung Seob Kim, Gyeongsan-si (KR)

(73) Assignee: KUNHWA ENG CO., LTD., Gyeongsan-si (KR)

( * ) Notice: Subject to any disclaimer, the term of this patent is extended or adjusted under 35 U.S.C. 154(b) by 23 days.

(21) Appl. No.: 16/244,541

(22) Filed: Jan. 10, 2019

(65) Prior Publication Data

US 2019/0219125 A1    Jul. 18, 2019

(51) Int. Cl.
| | |
|---|---|
| *F16F 9/38* | (2006.01) |
| *F16F 9/58* | (2006.01) |
| *B60G 7/04* | (2006.01) |
| *F16F 9/10* | (2006.01) |
| *F16F 9/32* | (2006.01) |

(52) U.S. Cl.
CPC ............... *F16F 9/38* (2013.01); *B60G 7/04* (2013.01); *F16F 9/103* (2013.01); *F16F 9/3242* (2013.01); *F16F 9/58* (2013.01); *B60G 2204/4308* (2013.01); *B60G 2204/45021* (2013.01); *F16F 2230/0023* (2013.01); *F16F 2232/08* (2013.01)

(58) Field of Classification Search
CPC .. F16F 9/38; F16F 9/103; F16F 9/3242; F16F 9/58; F16F 2230/0023; F16F 2232/08; B60G 7/04

USPC .................................................... 188/322.12
See application file for complete search history.

(56) References Cited

U.S. PATENT DOCUMENTS

| | | | | |
|---|---|---|---|---|
| 5,402,868 A | * | 4/1995 | Handke ...................... | F16F 9/38 188/322.12 |
| 5,901,947 A | * | 5/1999 | Fotino ....................... | F16F 9/58 267/195 |
| 6,460,665 B1 | * | 10/2002 | Gotz ......................... | B60G 15/14 188/322.12 |
| 8,689,953 B2 | * | 4/2014 | Bauman .................... | F16F 9/38 188/322.12 |
| 9,346,333 B2 | * | 5/2016 | Seo .......................... | B60G 15/06 |
| 9,829,062 B2 | * | 11/2017 | Tsunekawa .............. | F16F 9/585 |
| 2001/0015537 A1 | * | 8/2001 | De Fontenay ........... | B60G 15/068 280/124.155 |

(Continued)

*Primary Examiner* — Thomas W Irvin
(74) *Attorney, Agent, or Firm* — Im IP Law; Chai Im; C. Andrew Im

(57) ABSTRACT

A bumper stopper installed on the shock absorber of a vehicle to respond to the impact of a cylinder lifting or lowering in the vertical direction depending on the running state of the vehicle. The bumper stopper is constructed such that a cylindrical dust cover having an opening formed at the lower end thereof is connected to a buffer member formed of peaks and troughs. The buffer member has a through hole through which a cylinder and rod of a shock absorber passes via a connection plate so that the buffer member and the dust cover are integrated with each other. It prevents air from being compressed inside the buffer member, thereby preventing component damage due to high pressure. Also, it prevents abnormal noise from occurring in the process of contact and separation between the cylinder and the connection plate, thereby providing improved ride comfort.

1 Claim, 7 Drawing Sheets

(56) References Cited

U.S. PATENT DOCUMENTS

| | | | | |
|---|---|---|---|---|
| 2007/0181392 A1* | 8/2007 | Pawloski | ............... | F16F 9/38 |
| | | | | 188/322.12 |
| 2011/0156327 A1* | 6/2011 | Nobusue | ............... | B60G 7/04 |
| | | | | 267/153 |
| 2013/0161888 A1* | 6/2013 | Szekely | ............... | B60G 11/22 |
| | | | | 267/220 |
| 2014/0077430 A1* | 3/2014 | Heo | ............... | F16F 9/38 |
| | | | | 267/292 |
| 2015/0068855 A1* | 3/2015 | Matsumura | ............... | F16F 9/38 |
| | | | | 188/322.12 |

* cited by examiner

DUST COVER ASSEMBLED BUMPER STOPPER

RELATED APPLICATION

This application which claims priority from Korean Patent Application No. 10-2018-0005263 filed Jan. 15, 2018, which is herein incorporated by reference in its entirety.

FIELD OF THE INVENTION

The present invention relates to a dust cover assembled bumper stopper and, more specifically, to a bumper stopper, which is installed on the shock absorber of a vehicle so as to respond to the impact of a cylinder that lifts or lowers in the vertical direction depending on the running state of the vehicle, wherein a dust cover is integrated with the bumper stopper.

BACKGROUND OF THE INVENTION

In a vehicle, the tilting or vibration, shock, etc. due to the bending or slope of the road surface, acceleration or braking, turning, etc. are transmitted to the wheels (axles) in various directions. Most vehicles are equipped with a shock absorber to prevent such tilting or vibration or shock from being transmitted to the vehicle body and passengers even if the wheels are applied with the same, thereby improving the ride comfort and allowing the vehicle to be stably controlled.

The shock absorber is composed of a combination of a cylinder (a shock absorber) filled with oil or gas and a coil spring encompassing the cylinder. Among the components constituting the shock absorber, there are a bumper stopper for coping with the impact of the cylinder, a dust cover for protecting the cylinder from dust or foreign materials, etc.

Conventionally, the bumper stopper and the dust cover have been separately manufactured and then installed in the shock absorber. However, in the case where the bumper stopper and the dust cover are separately manufactured, not only the cost of preparing the components increases, but also problems of an increase in cost and the like occur due to the increase in manufacturing process of the shock absorber.

In order to solve the problems resulted from the separate manufacture of the bumper stopper and the dust cover, a bumper stopper including a dust cover integrated in the bumper stopper has been proposed and used in the shock absorbers of lots of vehicles.

FIG. 1 shows a cross-sectional view for illustrating a state, in which a conventional bumper stopper 1 with an integrated dust cover 4 is installed on a shock absorber 5. As shown in FIG. 1, the bumper stopper 1 is constructed such that the dust cover 4 is integrated by connecting the buffer member 2 of the bumper stopper 1 and the dust cover 4 by a connection plate 3

The bumper stopper 1 constructed as above is mounted between a spring retainer 7 and a spring seat 8 in the shock absorber 5, wherein the rod L of a cylinder C passing through the buffer member 2 is fixed to a mount bracket 6 and the upper end portion of the cylinder C is inserted to be installed through the lower end portion of the dust cover 4, thereby forming the shock absorber 5.

If a vehicle with the shock absorber 5 is tilted or vibration or shock occurs while the vehicle is running, the cylinder C and rod L of the shock absorber 5 shrinks and the upper end of the cylinder C comes into contact with the inner surface of the connection plate 3 of the bumper stopper 1, (see FIG. 3) the buffer member 2 formed at the upper portion of the connection plate 2 is contracted due to the contact between the cylinder C and the connection plate 2, and in this process, the inner space of the buffer member 20 is kept closed by the upper end portion of the cylinder C.

The buffer member 2 of the bumper stopper 1 installed in the shock absorber 5 shrinks and prevents the cylinder C from operating over a limited range while preventing the shock from being applied to the cylinder C, wherein if a load applied to the shock absorber 5 increases, the shrinkage of the buffer member 2 and the force exerted by the upper end of the cylinder C on the inner surface of the connection plate 3 of the bumper stopper 1 are inevitably increased in proportion.

SUMMARY OF THE INVENTION

Technical Problem

The conventional dust cover integrated bumper stopper has problems in that as the force exerted by the upper end of the cylinder on the inner surface of the connection plate of the bumper stopper is strong, the impact thereof becomes strong, and as the cylinder and the connection plate come into contact with each other more frequently, the risk of damage or breakage of the connection plate increases.

In addition, the conventional dust cover integrated bumper stopper has a problem in that the air is inevitably compressed inside the buffer member, which is sealed by the upper end of the cylinder, while the buffer member is contracted due to the contact between the cylinder and the connection plate. It is pointed out that the air repetitively compressed inside the buffer member slowly damages the buffer member and the connection plate and thus acts as a durability deterioration factor of the bumper stopper, wherein abnormal noise occurs due to the compressed air in the process of contact and separation between the cylinder and the connection plate such that the ride comfort is deteriorated and the driver who manipulates the vehicle can feel anxiety about the state of the vehicle.

Accordingly, the present invention has been made to solve the above mentioned problems occurring in the conventional dust cover integrated bumper stopper, and thus the present invention has an objective to provide a bumper stopper, in which the rigidity of the connection plate for connecting the buffer member and the dust cover is reinforced, thereby improving the durability, air is prevented from being compressed inside the buffer member in the course of contact between the cylinder and the connection plate, thereby preventing damage to components due to high pressure, and abnormal noise is prevented from occurring in the process of contact and separation between the cylinder and the connection plate, thereby providing improved ride comfort to occupants and relieving anxiety of operation.

Technical Solution

To accomplish the above objective, the present invention provides a bumper stopper constructed such that a cylindrical dust cover having an opening formed at the lower end thereof is connected to a buffer member formed of a combination of peaks and troughs and having a through hole, through which a cylinder rod of a shock absorber passes, by means of a connection plate so that the buffer member and the dust cover are integrated with each other, the bumper stopper characterized in that a plurality of linear reinforcement protrusions are formed on the upper surface of the connection plate so as to extend radially from a boundary point with respect to the buffer member to a boundary point with respect to the dust cover, a plurality of ring-shaped connection protrusions are formed in the center on the upper surface of the connection plate so as to connect the linear reinforcement protrusions, an exhaust groove is formed on the inside of the linear reinforcement protrusion so as to be recessed upwards, and a connection groove is formed on the inside of the ring-shaped connection protrusion so as to be depressed upwards, so that the respective exhaust grooves communicate with each other by the connection grooves.

Effect of the Invention

According to the bumper stopper proposed in the present invention, the buffer member and the dust cover are connected to each other by means of the connection plate so as to be integrated, wherein the responsiveness against the contact (impact) with the cylinder that is the counterpart is improved by increasing the strength of the connection plate and thus the durability of the bumper stopper is improved such that the bumper stopper can be used for a long time.

According to the bumper stopper proposed in the present invention, the exhaust groove is formed on the connection plate so as to prevent the air from being compressed inside the buffer member during the contact between the cylinder and the connecting plate, thereby preventing component damage due to high pressure, and to prevent abnormal noise from occurring in the process of contact and separation between the cylinder and the connection plate, thereby providing an improved ride feeling to the occupants and relieving anxiety in the operation process. Therefore, the present invention is beneficial in the expected effect thereof.

BRIEF EXPLANATION OF REFERENCE NUMERALS

Figure 1:
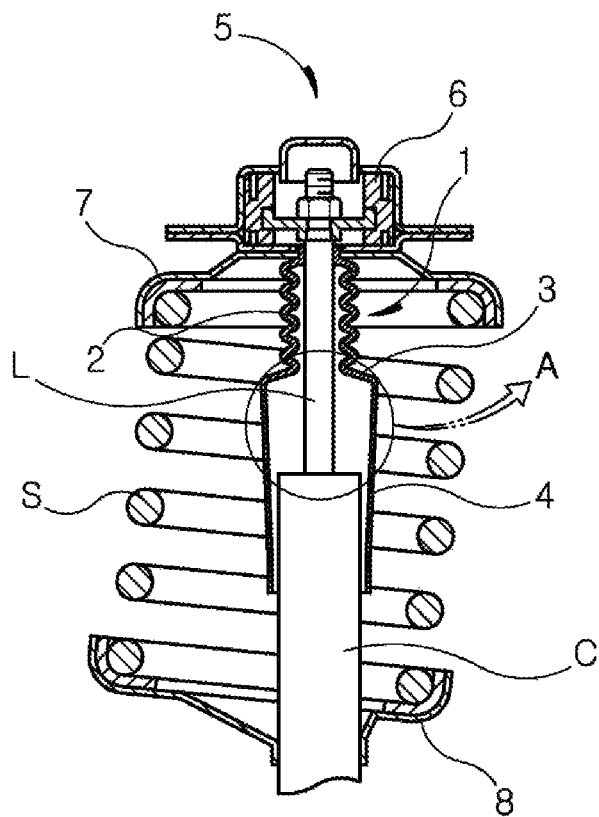
FIG. 1 is a cross-sectional view showing a state, in which a conventional bumper stopper with an integrated dust cover is installed on a shock absorber.
Figure 2:
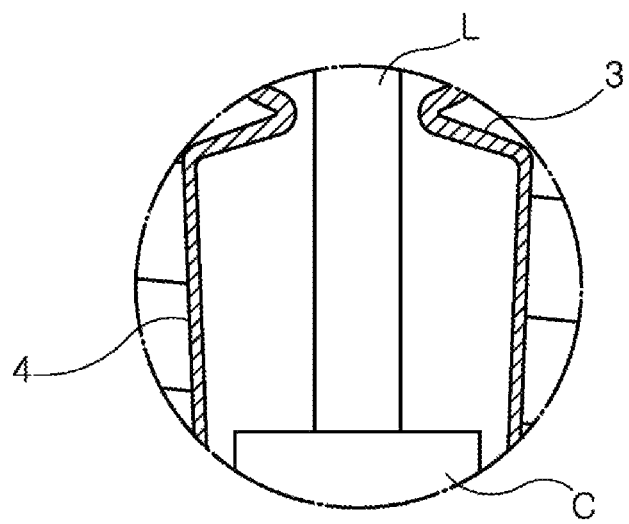
FIG. 2 is a reference diagram showing part "A" of FIG. 1 in an enlarged view.
Figure 3:
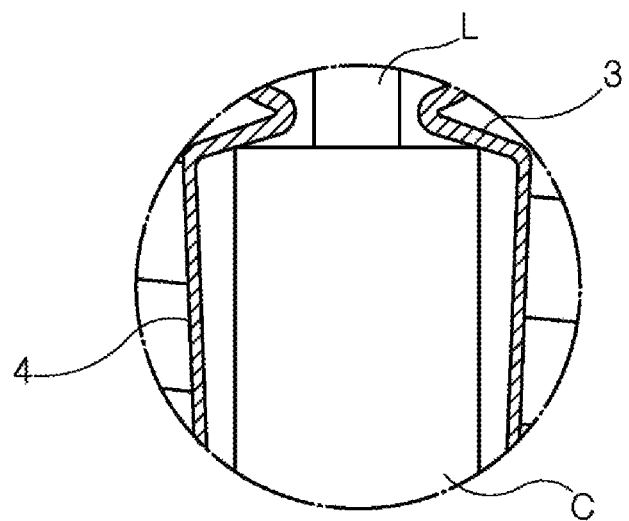
FIG. 3 is a reference diagram for explaining the operational relationship between the conventional bumper stopper and a counterpart thereof.

| | |
|---|---|
| 10: bumper stopper | 20: buffer member |
| 21: peaks | 22: troughs |
| 23: through hole | 30: connection plate |
| 31: linear reinforcement protrusion | |
| 31a: exhaust groove | |
| 32: ring-shaped connection protrusion | |
| 32a: connection groove | |
| 40: dust cover | 41: opening |

DETAILED DESCRIPTION OF THE PREFERRED EMBODIMENT

The present invention will now be described in detail with reference to the accompanying drawings in the present invention. First, it should be noted that, in the drawings, the same components or parts have the same reference signs as much as possible. In describing the present invention, a detailed description of related known functions or features is omitted in order to avoid obscuring the gist of the present invention.

Figure 4:
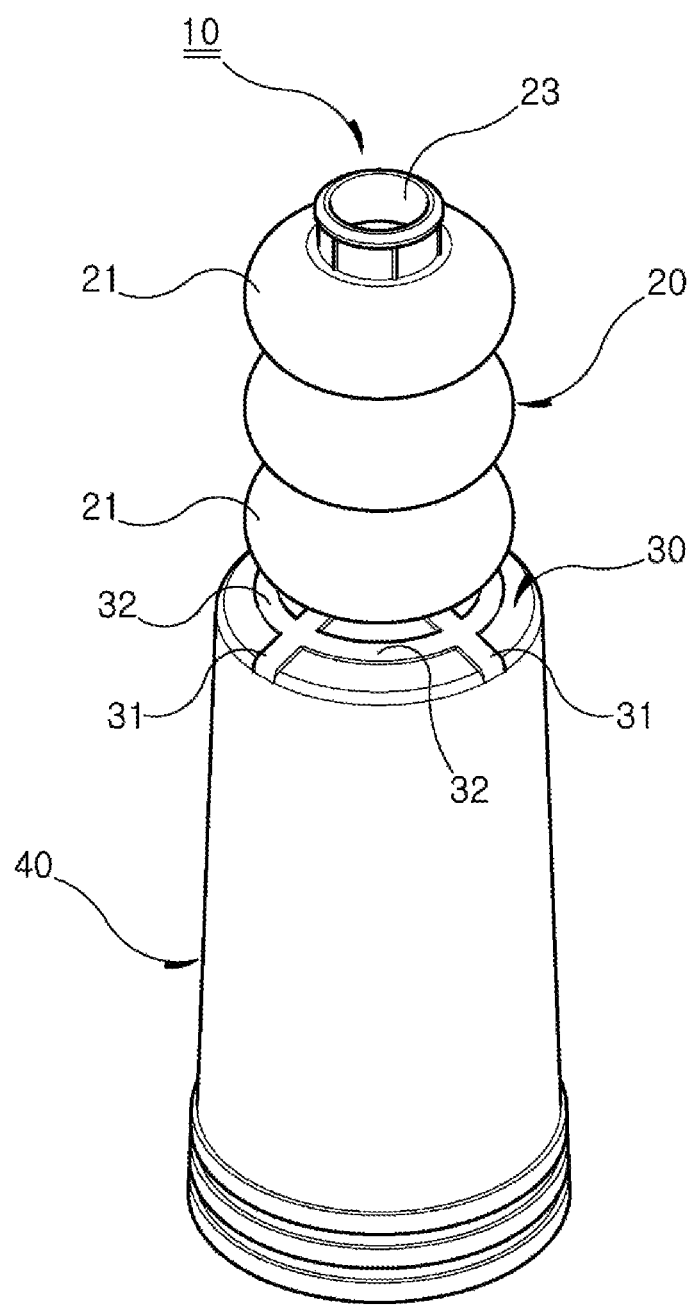
FIG. 4 is a perspective view showing a preferred embodiment of the bumper stopper proposed in the present invention.
Figure 5:
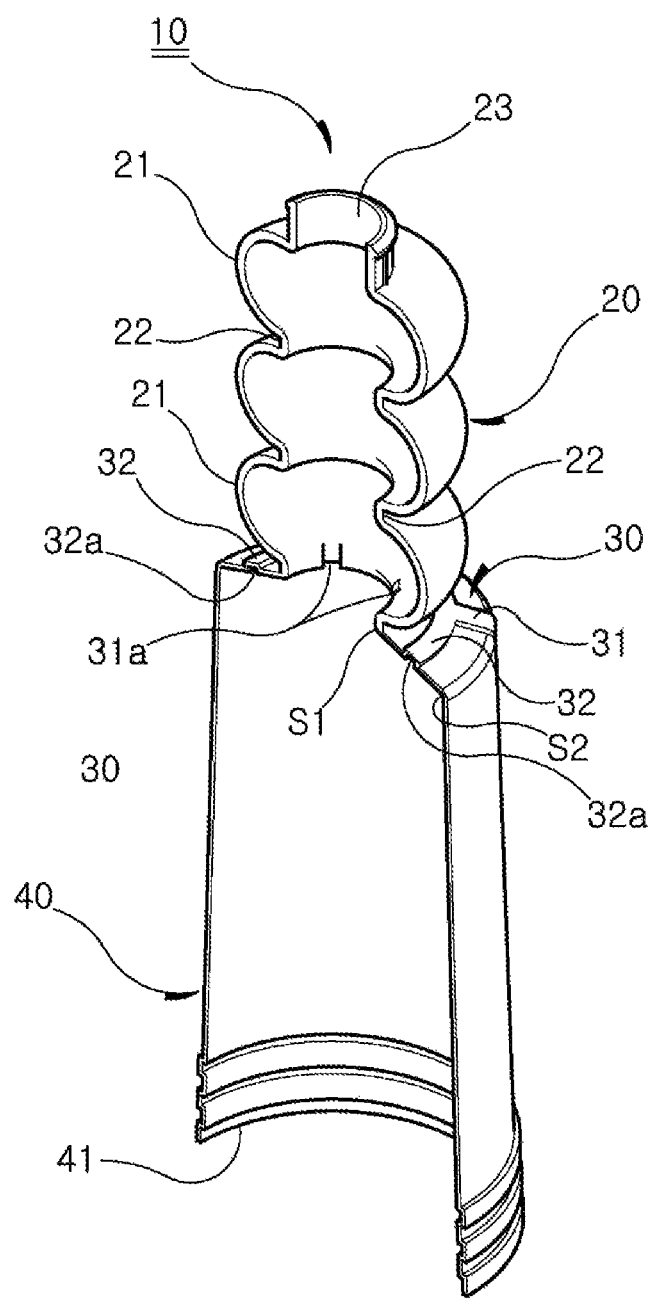
FIG. 5 is a reference perspective view showing a part of the bumper stopper proposed in the present invention.

FIG. 4 is a perspective view showing a preferred embodiment of a bumper stopper 10 proposed in the present invention, and FIG. 5 is a reference perspective view showing a part of the bumper stopper 10 proposed in the present invention.

As shown in FIG. 4 and FIG. 5, it could be appreciated that the present invention provides a bumper stopper 10 constructed such that a cylindrical dust cover 40 having an opening 41 formed at the lower end thereof is connected to a buffer member 20 formed of a combination of peaks 21 and troughs 22 and having a through hole 23, through which a cylinder C and rod L of a shock absorber 5 passes, by means of a connection plate 30 so that the buffer member 20 and the dust cover 40 are integrated with each other.

A plurality of linear reinforcement protrusions 31 are formed on the upper surface of the connection plate 30 so as to extend radially from a boundary point S1 with respect to the buffer member 20 to a boundary point S2 with respect to the dust cover 40, and a plurality of ring-shaped connection protrusions 32 are formed in the center on the upper surface of the connection plate 30 so as to connect the linear reinforcement protrusions 31.

The linear reinforcement protrusions 31 and ring-shaped reinforcement protrusions 32 provided on the upper surface of the connection plate 30 as mentioned above reinforce the strength of the connection plate 30 such that the responsiveness against the continuous contact (impact) with the cylinder C of the shock absorber 5 that is the counterpart is improved such that the bumper stopper 10 can be used for a long time without damage.

Figure 6:
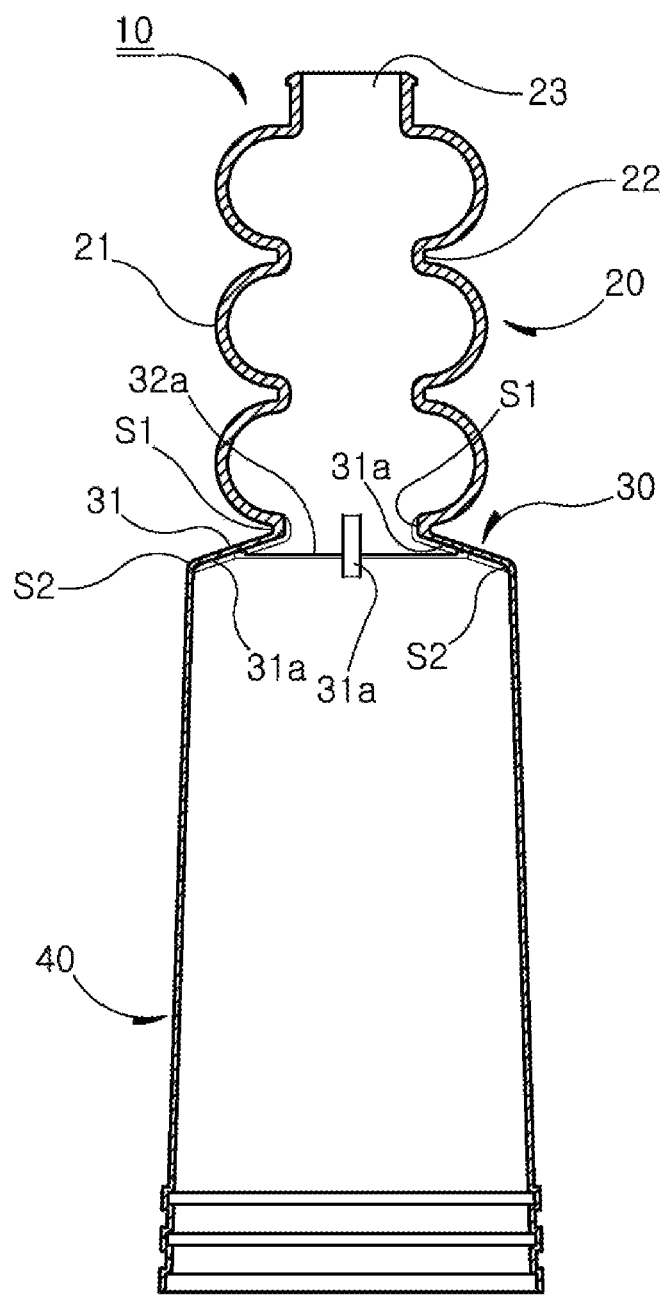
FIG. 6 is a cross-sectional view of the bumper stopper proposed in the present invention.

FIG. 6 is a cross-sectional view of the bumper stopper 10 proposed in the present invention. As shown in FIG. 6, an exhaust groove 31a is formed on the inside of the linear reinforcement protrusion 31 so as to be recessed upwards, and a connection groove 32a is formed on the inside of the ring-shaped connection protrusion 32 so as to be depressed upwards, so that the respective exhaust grooves 31a communicate with each other by the connection grooves 32a.

Figure 7:
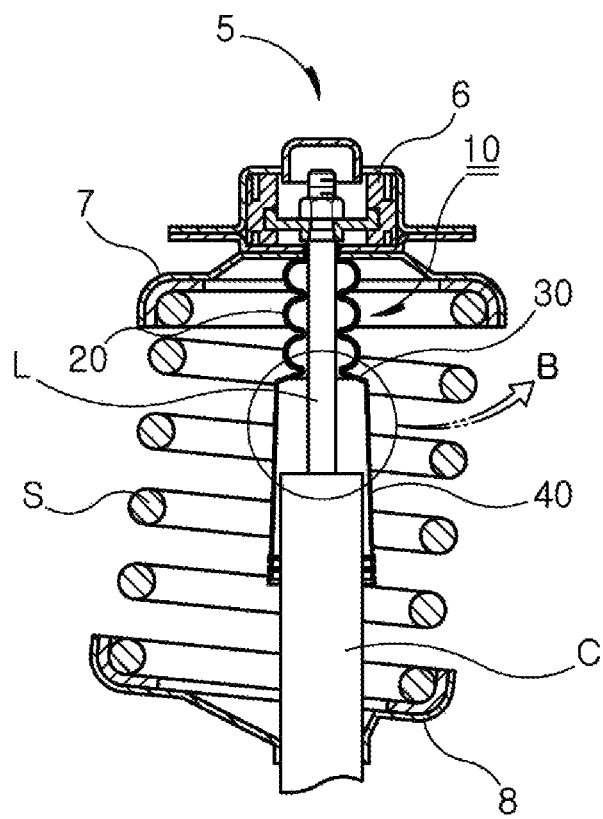
FIG. 7 is a reference cross-sectional view showing a state, in which the bumper stopper proposed in the present invention is installed in a shock absorber.
Figure 8:
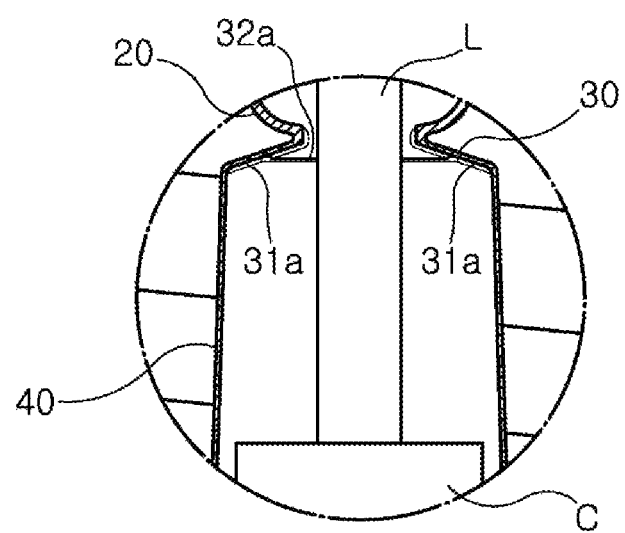
FIG. 8 is a reference diagram showing part "B" of FIG. 1 in an enlarged view.

FIG. 7 is a reference cross-sectional view showing a state, in which the bumper stopper 10 proposed in the present invention is installed in the shock absorber 5. As shown in FIG. 7, the present invention is mounted in use between a spring retainer 7 and a spring seat 8 in the shock absorber 5, wherein the cylinder C and rod L having passed through the insertion hole 23 of the buffer member 2 is fixed to a mount bracket 6 and the upper end portion of the cylinder C is inserted to be installed through the lower end opening 41 of the dust cover 4, thereby forming the shock absorber 5.

The bumper stopper 10 proposed in the present invention includes the exhaust groove 31a formed to be recessed upwards on the inside of the linear reinforcement protrusion 31 of the connection plate 30, which connects the buffer member 20 and the dust cover 40, and a connection groove 32a formed to be depressed upwards on the inside of the ring-shaped connection protrusion 32, so that the respective exhaust grooves 31a communicate with each other by the connection grooves 32a. The bumper stopper 10 proposed in the present invention secures the plurality of exhaust grooves 31a as means for discharging the air inside the buffer member 20 when the cylinder C of the shock absorber 5, which is inserted into the dust cover 40 of the bumper stopper 10, comes into contact with the inner surface of the connection plate 30, thereby discharging the internal air more quickly and smoothly by connecting the respective exhaust grooves 31a by the connection grooves 32a.

Figure 9:
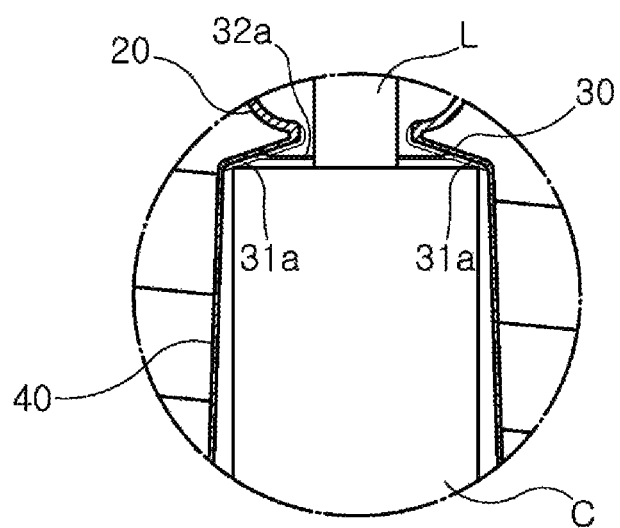
FIG. 9 is a reference diagram for explaining the operational relationship between the bumper stopper proposed in the present invention and a counterpart thereof.

FIG. 9 is a reference diagram for explaining the operational relationship between the bumper stopper 10 proposed in the present invention and a counterpart thereof. As shown in FIG. 9, the bumper stopper 10 presented in the present invention can fundamentally prevent the air compression phenomenon when the upper end portion of the cylinder C comes into contact with the inner surface of the connection plate 30 and the buffer member 20 is contracted so that the air inside the buffer member 20 is discharged through the exhaust groove 31a and the inner space of the buffer member 20 is sealed, prevent abnormal noise from occurring in the process of contact and separation between the cylinder C and the connection plate 30 by preventing the air compression phenomenon inside the buffer member 20, thereby improving riding comfort and relieving the anxiety of a driver, and prevent the air compressed inside the buffer member 20 from damaging the buffer member 20 and the connection plate 30.

It would be apparent to a person skilled in the art, to which the present invention belongs, that the present invention described above is not limited to the embodiments and the accompanying drawings, but various permutations, modifications and alterations can be made without departing from the technical idea of the present invention.

The invention claimed is:

1. A cylindrical dust cover assembled bumper stopper, comprising:
   the cylindrical dust cover having an opening formed at a lower end thereof being connected to a buffer member formed of a combination of peaks and troughs, the buffer member having a through hole, through which a cylinder and rod of a shock absorber passes, by means of a connection plate so that the buffer member and the cylindrical dust cover are integrated with each other;
   a plurality of linear reinforcement protrusions formed on an upper surface of the connection plate extending radially from a first boundary point with respect to the buffer member to a second boundary point with respect to the dust cover;
   a plurality of ring-shaped connection protrusions formed in a center on the upper surface of the connection plate connecting said plurality of linear reinforcement protrusions;
   an exhaust groove formed on inside of each linear reinforcement protrusion recessing upwards; and
   a connection groove formed on inside of each ring-shaped connection protrusion depressing upwards, so that respective exhaust grooves communicate with each other by the connection grooves.

* * * * *